(12) United States Patent  (10) Patent No.: US 7,810,714 B2
Murata  (45) Date of Patent: Oct. 12, 2010

(54) CHECK PROCESSING METHOD, CHECK PROCESSING PROGRAM MEDIUM, AND CHECK PROCESSING APPARATUS

(75) Inventor: Sadao Murata, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 109 days.

(21) Appl. No.: 11/746,973

(22) Filed: May 10, 2007

(65) Prior Publication Data

US 2007/0205264 A1  Sep. 6, 2007

Related U.S. Application Data

(63) Continuation of application No. 11/116,593, filed on Apr. 28, 2005, now Pat. No. 7,219,831.

(30) Foreign Application Priority Data

May 12, 2004 (JP) ............................. 2004-142340

(51) Int. Cl.
 *G06Q 40/00* (2006.01)
(52) U.S. Cl. .......................... 235/379; 705/43; 705/45; 902/9; 902/18
(58) Field of Classification Search ................. 235/379; 705/30, 45; 707/200; 382/100
See application file for complete search history.

(56) References Cited

U.S. PATENT DOCUMENTS

| H524 H | 9/1988 | Weideman | |
|---|---|---|---|
| 4,948,174 A | 8/1990 | Thomson et al. | |
| 5,544,043 A | 8/1996 | Miki et al. | |
| 5,678,046 A * | 10/1997 | Cahill et al. | 707/200 |
| 5,789,727 A | 8/1998 | Teradaira et al. | |
| 5,965,862 A | 10/1999 | Momose | |
| 6,068,187 A | 5/2000 | Momose | |
| 6,182,896 B1 | 2/2001 | Momose | |
| 6,257,783 B1 | 7/2001 | Hanaoka et al. | |
| 6,290,129 B2 | 9/2001 | Momose | |
| 6,363,164 B1 | 3/2002 | Jones et al. | |
| 6,473,519 B1 | 10/2002 | Pidhirny et al. | |
| 6,721,783 B1 | 4/2004 | Blossman et al. | |
| 6,739,503 B1 | 5/2004 | Murison | |
| 6,758,395 B2 | 7/2004 | Elwin | |
| 6,789,795 B2 | 9/2004 | Kallin et al. | |
| 7,000,828 B2 | 2/2006 | Jones | |
| 7,090,131 B2 | 8/2006 | Natsuno | |
| 7,182,249 B2 | 2/2007 | Johannesson et al. | |

(Continued)

FOREIGN PATENT DOCUMENTS

JP  62-26577  2/1987

(Continued)

*Primary Examiner*—Thien M. Le
*Assistant Examiner*—Sonji Johnson

(57) ABSTRACT

Check processing involves scanning a back of a check having no authorization data printed thereon, electronically generating authorization data indicating that processing a check payment has been completed, and generating an electronic merged image by electronically combining back image data captured during the scanning of the back of the check with generated authorization data, such that, in the electronic merged image, the authorization data appears outside of an endorsement area. Moreover, these operations are performed in a single pass of the check in one direction through a transportation path of a check processing apparatus. No printing of any data is required. The check processing can be embodied in a method, apparatus, or instructions embodied on a machine-readable medium.

3 Claims, 9 Drawing Sheets

U.S. PATENT DOCUMENTS

| | | |
|---|---|---|
| 2001/0045452 A1 | 11/2001 | Momose et al. |
| 2002/0052852 A1* | 5/2002 | Bozeman .................... 705/64 |
| 2002/0145035 A1 | 10/2002 | Jones |
| 2002/0152169 A1 | 10/2002 | Dutta et al. |
| 2002/0184151 A1* | 12/2002 | Maloney .................... 705/45 |
| 2005/0033695 A1 | 2/2005 | Minowa |
| 2005/0129270 A1* | 6/2005 | Prakash .................... 382/100 |
| 2005/0129300 A1 | 6/2005 | Sandison et al. |

FOREIGN PATENT DOCUMENTS

| | | |
|---|---|---|
| JP | 4-130574 | 5/1992 |
| JP | 7244702 | 9/1995 |
| JP | 09044673 | 2/1997 |
| JP | 10278394 | 10/1998 |
| JP | 117497 | 1/1999 |
| JP | 2000259764 | 9/2000 |
| JP | 2000344428 | 12/2000 |
| JP | 2003006173 | 1/2003 |
| JP | 2003006551 | 1/2003 |

\* cited by examiner

Face

Back

CHECK PROCESSING METHOD, CHECK PROCESSING PROGRAM MEDIUM, AND CHECK PROCESSING APPARATUS

RELATED APPLICATION

This application is a continuation of, and claims priority under 35 U.S.C. §120 on, U.S. application Ser. No. 11/116,593, filed Apr. 28, 2005, the content of which is incorporated by reference herein in its entirety.

BACKGROUND OF THE INVENTION

1. Field of the Invention

The present invention relates to a method, a program medium, and an apparatus for processing checks in conjunction with using checks to complete financial transactions.

2. Description of the Related Art

When a check is processed for payment in a bank, authorization data indicating that the check has been processed is imprinted on the back of the check. The front and back of the check imprinted with this authorization data are then scanned and the captured image data is stored so that the image data can be retrieved and used as proof or evidence of transaction if the customer, bank, or store later questions the transaction.

Check processing apparatuses such as these used in banks therefore typically have the following devices positioned along the check transportation path in order starting from the upstream end: a magnetic ink character recognition reader (MICR) for reading magnetic ink characters printed on each check, a print head for printing the authorization data, and two image scanners for scanning the front and back sides of each check.

Thus positioning scanners for scanning the front and back sides of the check downstream from the print head increases the length of the check transportation path and thus increases the size of the apparatus. Furthermore, if the magnetic ink character area of the check is also scanned in order to complement the MICR function, a third scanner must also be positioned upstream of the MICR. This obviously further increases the size and parts count of the apparatus.

If scanners for scanning the front and back of the check are positioned upstream of the print head and the back of the check with imprinted authorization data is also to be scanned, the check must be reinserted after the authorization data is printed in order to scan the back side of the check. Operation is thus more complicated and inefficient.

To avoid the foregoing problem, Japanese Unexamined Patent Application 2000-344428 discloses a check processing apparatus having a U-shaped check transportation path with a scanner, print head, and MICR positioned in sequence from the upstream side. After printing the check, this check processing apparatus changes the check transportation path and repeats the check scanning operation.

This check processing apparatus has two drive rollers positioned along the check transportation path and one transportation roller in proximity to the check exit. A reversible motor rotationally drives these other rollers by way of an intervening gear train. The gear train turns the transportation roller forward or reverse according to the direction the motor is driving, but the drive rollers always turn in the forward direction regardless of which direction the motor is turning. More specifically, the direction in which the motor turns controls whether a check is conveyed to and discharged from the check exit, or whether the transportation path is changed by a guide for changing the transportation path and the check is thus returned to the check transportation path.

The check processing apparatus thus arranged scans the front of the check, reads the magnetic ink characters, prints the check, conveys the check to near the check exit during a first pass of the check through the transportation path, and then reverses the transportation rollers to return the check to near the check insertion slot. The back of the check is then printed during a second pass of the check through the transportation path.

After then conveying the check to near the check exit again, the transportation roller is again reversed to return the check to near the check insertion opening. The printed face of the check is then scanned during a third pass through the transportation path to near the check exit, and the feed roller drives forward to discharge the check from the exit. If the back of the check is to be scanned after the back is printed, the check is again returned to near the check insertion opening after the third pass, and the back of the check is then scanned during a fourth pass.

The foregoing check processing apparatus thus reduces the size of the apparatus while enabling scanning both the front and back sides of a printed check with a single check insertion operation. However, the construction and control of this check processing apparatus are relatively complex, and check processing requires a long time. The likelihood of paper jams also increases because each check is conveyed multiple times through the transportation path.

OBJECT OF THE INVENTION

An object of the present invention is therefore to provide a check processing method, a program, and a check processing apparatus for generating an electronic merged image in which image data captured from the back of a printed check is combined with authorization data in a single pass of the check in one direction through a transportation path of such an apparatus.

SUMMARY OF THE INVENTION

To achieve the foregoing object, a check processing method according to the present invention comprises scanning a back of a check having no authorization data printed thereon; generating authorization data indicating that processing a check payment has been completed, the authorization data being generated electronically and not being printed on the check; and generating an electronic merged image by electronically combining back image data captured during the scanning of the back of the check with generated authorization data, such that, in the electronic merged image, the authorization data appears outside of an endorsement area, the electronic merged image being generated without printing any data. Moreover, the steps of scanning the back of the check, generating authorization data, and generating the electronic merged image are performed in a single pass of the check in one direction through a transportation path of a check processing apparatus.

In accordance with another aspect of the invention, a check processing apparatus configured to communicate with a host device is provided. Such apparatus comprises a transportation path for conveying a check from a check insertion opening to an exit opening; a transportation mechanism that conveys the check through the transportation path; a back image scanning component that captures a back image of the check conveyed through the transportation path; an authorization data component that sends a request to the host device for electronic authorization data indicating that processing a check payment has been completed, wherein the authorization data component receives the requested electronic authorization data from the host device if the check is determined to be valid; and a merged image generating component that generates an electronic merged image by combining the back image data captured by the back image scanning component with the received electronic authorization data, such that, in the electronic merged image, the electronic authorization data appears outside of an endorsement area. The apparatus is further configured such that the back image is captured, the authorization data is requested, and the electronic merged image is generated in a single pass of the check in one direction through the transportation path.

The present invention is well adapted for use in a check processing apparatus that does not have print capability, thus allowing for a more simplified arrangement of the check processing apparatus. Furthermore, the invention can be employed in completely or substantially paperless systems that involve transfer of electronic data between multiple companies and\or financial institutions.

A check typically has an endorsement area where information is written or printed by a payee of the check. This information verifies that the check was used in a particular business and may include banking account information for that business, such as a store where the check is used. In generating the merged image the authorization data is merged so that it appears outside the endorsement area. As a result, information written or printed in the endorsement area by the business is not lost or visually obscured as a result of the merging process.

In another aspect, the invention includes a medium readable by a machine embodying a program of instructions executable by the machine to execute the operations of a check processing method as described herein.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A check processing method, program embodied on a medium, and check processing apparatus according to preferred embodiments of the present invention are described below with reference to the accompanying figures.

An electronic payment process using a check is described first briefly below.

Figure 1A:
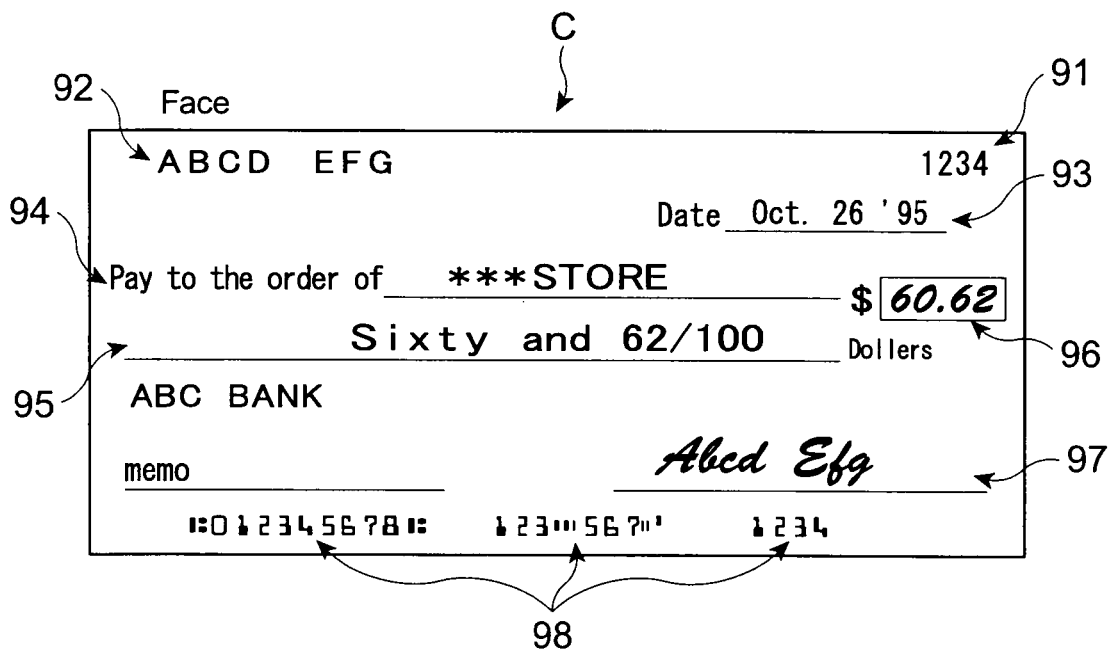
FIG. 1A is a plan view showing a typical face of check.

As shown in FIG. 1A, a check serial number 91 and account-holder name 92 are preprinted on the face of the check C together with spaces for writing the date 93, payee 94, check amount 95, 96, and a signature line 97. The bank identification number, account number, and check number are also printed in magnetic ink characters (MIC) 98 along the bottom on the check face. Validity of the check C is determined by reading and referencing the information printed in the magnetic ink characters 98 using a magnetic ink character reader (MICR) 13 (see FIG. 4).

Figure 1B:
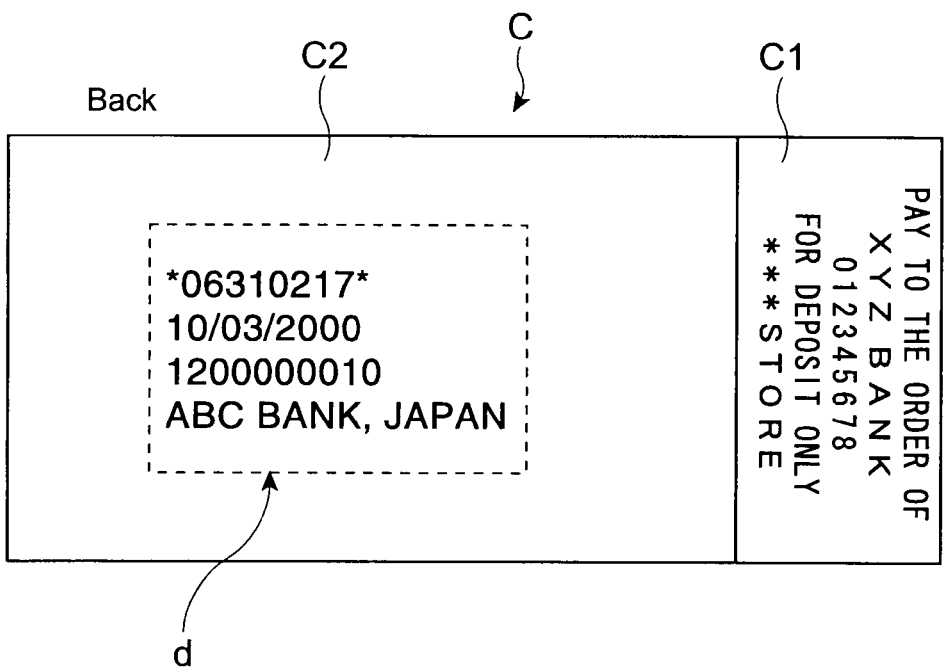
FIG. 1B is a plan view showing a typical back of check.

The check user writes the date, payee, and payment amount on the face of the check C and then signs the check C before handing the check to the store clerk, for example. As shown in FIG. 1B, the clerk then writes or prints an endorsement in a specific endorsement area on the back of the check. The endorsement typically includes information proving that the check C was used, as well as deposit information. The store then delivers the check C to a bank where the store has an account. Note that there are two endorsement areas on the back of the check: endorsement area C1 used for the store endorsement, and a bank processing area C2 used by the bank or other financial institution for printing authorization data. The store endorsement is thus written or printed in endorsement area C1.

When a bank receives a check that has been processed by a store or other business, the bank may print the check amount on the face of the check C in magnetic ink characters as may be needed using a printer other than that of the hybrid processing apparatus 1 according to the present invention. The check amount may also be printed on the face of the check C using the printing unit 120 of the hybrid processing apparatus 1 according to this embodiment of the invention. The magnetic ink characters 98 preprinted on the check C are then read using an MICR 13, and if the check is determined to be valid, authorization data d indicating that check processing has been completed by the bank is printed in the bank processing area C2 on the back of the check C. The front and back of the check C are then scanned and saved as image data. Note that while the content of the authorization data d includes the bank name, bank tracking number, processing date, and processing number, it may include other content depending upon the bank.

The bank then transfers the specified check amount from the bank account of the checking account holder to the bank account of the store where the check C was used. If the check is drawn on an account in a bank other than the same bank where the store has an account, the check C data, including the check number and amount, is sent to that other bank, that is, the bank on which the check is drawn, for processing.

Figure 2:
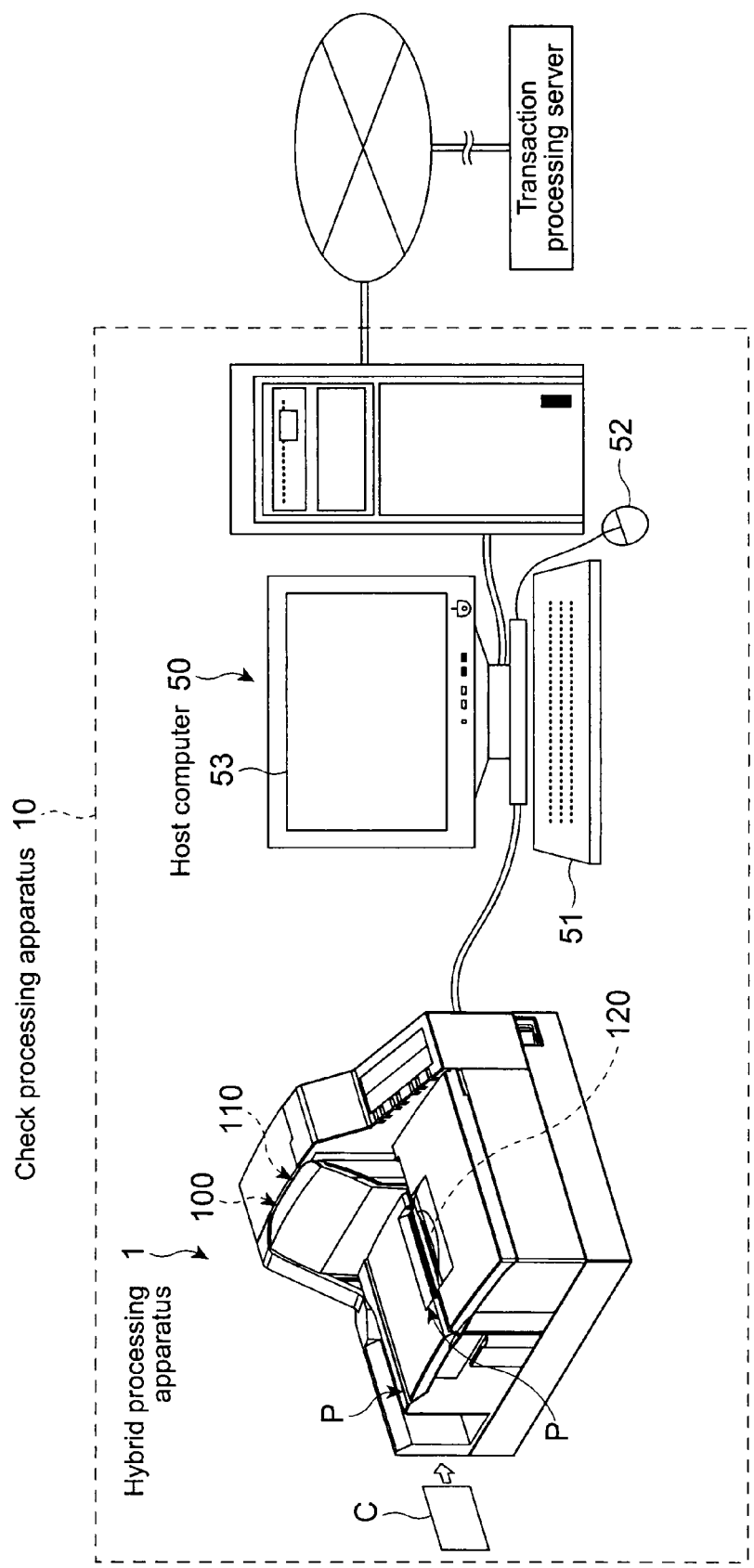
FIG. 2 is a schematic diagram showing a check processing apparatus according to a preferred embodiment of the present invention.

The arrangement of a check processing apparatus 10 according to the present invention is described next below. As shown in FIG. 2, a check processing apparatus 10 according to the present invention is composed of a hybrid processing apparatus 1 for scanning, reading and printing checks C, and a host computer 50 connected to the hybrid processing apparatus 1 for controlling generating the authorization data d and the hybrid processing apparatus 1.

The host computer 50 has an input device such as a keyboard 51 and mouse 52 for data entry, and an output device such as a display monitor 53 for displaying error messages, prompts, and check C image data. The host computer 50 communicates with the hybrid processing apparatus 1 via a wired connection such as a USB (Universal Serial Bus), parallel interface, LAN, or other cable, or via a wireless connection such as a wireless LAN or Bluetooth interface. Note that a wired connection is shown in FIG. 2 by way of example only.

The host computer 50 is also connected over a network (such as the Internet) to a transaction processing server for verifying check C validity. The host computer 50 receives check data read by the MICR 13 of the hybrid processing apparatus 1 (see FIG. 4) and sends the check data to the transaction processing server. Whether the check C is valid or invalid is then determined based on the response from the transaction processing server.

The arrangement of a hybrid processing apparatus 1 according to this embodiment of the invention is described next.

As shown in FIG. 2 the hybrid processing apparatus 1 has an image scanning unit 100 (also shown in FIG. 3) forming a U-shaped transportation path P for transporting checks C for scanning, a magnetic ink character reader (MICR) 110 (see FIG. 3) for reading magnetic ink characters preprinted on the check C, a printing unit 120 for printing authorization data on the check C, and a transportation mechanism 20 (see FIG. 3) for conveying checks C through the transportation path P.

Figure 3:
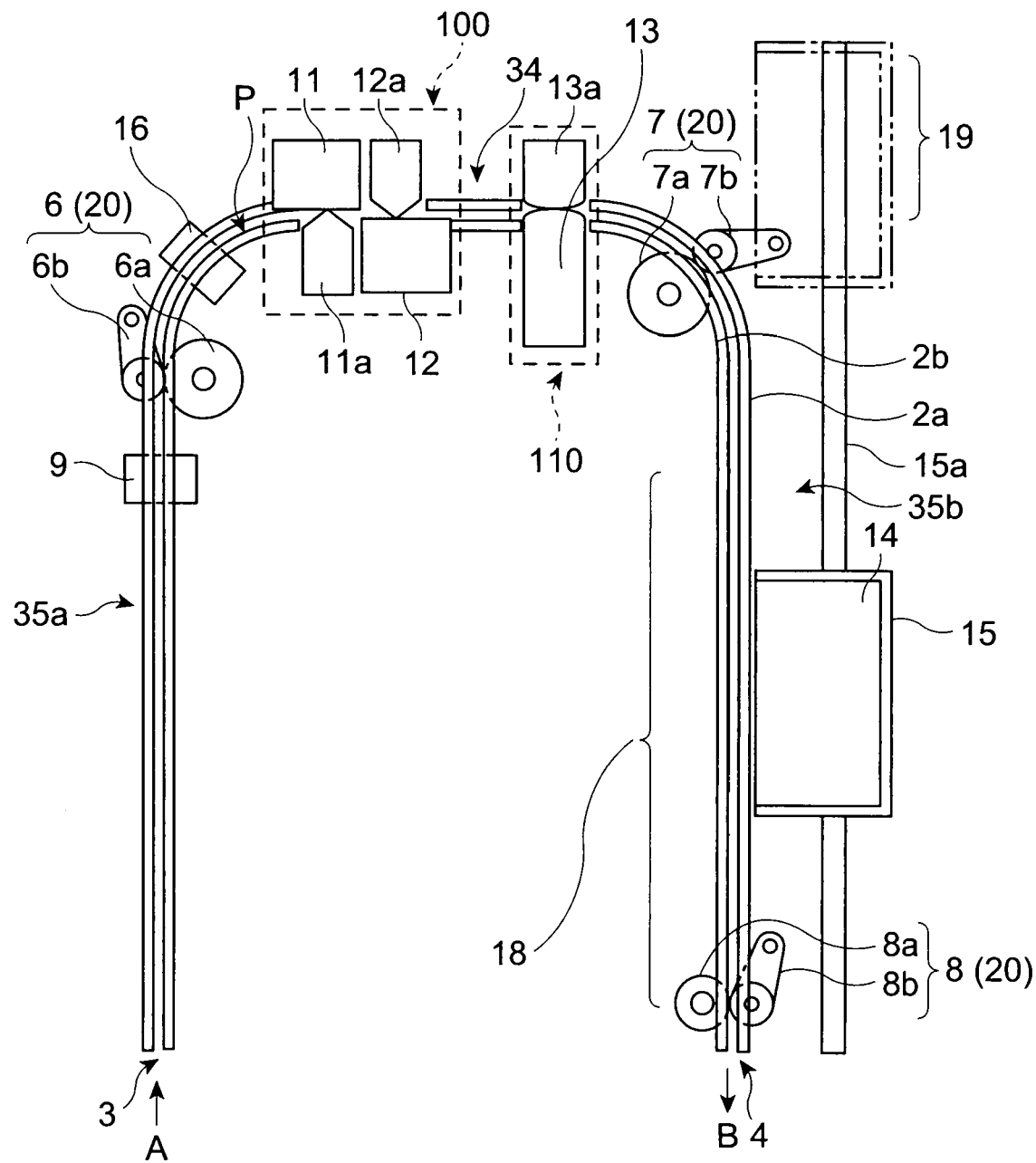
FIG. 3 is a schematic diagram showing the transportation path in a hybrid processing apparatus having the function of a check processing apparatus according to the present invention.

As shown in FIG. 3, the generally U-shaped transportation path P is a slit-shaped path formed between an outside guide 2a and an inside guide 2b, and has straight portions 35a and 35b and a U-shaped portion 34 formed between and communicating with both straight portions 35a and 35b.

When an operator inserts a check C from the check insertion opening 3 to the transportation path P, the transportation mechanism 20 conveys the check C through the straight portion 35a in the direction of arrow A, through the U-shaped portion 34 into straight portion 35b, through straight portion 35b in the direction of arrow B, and then discharges the check C from the check exit 4. Note that the direction of check transportation changes 180 degrees from the insertion direction indicated by arrow A as the check passes through the U-shaped portion 34. More specifically, the transportation mechanism 20 bends the check C in a U-shape as the check C travels through the transportation path P.

Note further that this hybrid processing apparatus 1 is arranged so that the front of the check C normally faces the inside guide 2b as the check C is conveyed through the transportation path P.

The transportation mechanism 20 has first transportation rollers 6, second transportation rollers 7, and discharge rollers 8. These roller sets 6, 7, and 8 are gripping rollers each having a drive roller 6a, 7a, 8a driven by a motor 40 shown in FIG. 4, and a pressure roller (driven roller) 6b, 7b, 8b for pressing a check C against the opposing drive roller.

The first transportation rollers 6 are positioned in a first corner part of the transportation path P. A bottom of form (BOF) detector 9 is positioned upstream of the first transportation rollers 6, and a top of form (TOF) detector 16 is positioned downstream of the first transportation rollers 6. The BOF detector 9 and TOF detector 16 are reflecting or transmitting type photodetectors for detecting the leading edge and trailing edge of a check C traveling through the transportation path P. Driving of the motor 40 starts when the BOF detector 9 detects the leading edge, and the first transportation rollers 6, second transportation rollers 7, and discharge rollers 8 thus start turning.

Two scanners 11, 12 and the MICR are positioned along the U-shaped portion 34 between the TOF detector 16 and the second transportation rollers 7. The two scanners 11, 12 constitute the image scanning unit 100 for scanning the back and front of the check. The MICR constitutes a magnetic ink character reading unit 110, shown in FIG. 4.

These two scanners 11, 12 are contact image sensor (CIS) or charge-coupled device (CCD) image sensors for scanning checks C. The back scanner 11 is positioned on the outside guide 2a side of the transportation path P for capturing images from the back side of each check C. The front scanner 12 is likewise positioned on the inside guide 2b side of the transportation path P for capturing images from the face of each check C. Pressure members (rollers) 11a, 12a opposing scanners 11, 12, respectively, with the transportation path P therebetween press the check C against the scanner 11, 12 surface for imaging.

The MICR is a magnetic reading detector having a magnetic head for reading magnetic ink characters printed on the surface of the check C, and is thus positioned on the inside guide 2b side of the transportation path P so that the MICR faces the front of the check C. A pressure member (pad) 13a is positioned opposite the MICR 13 with the transportation path P therebetween for pressing the check C against the MICR when reading the magnetic ink characters.

Figure 4:
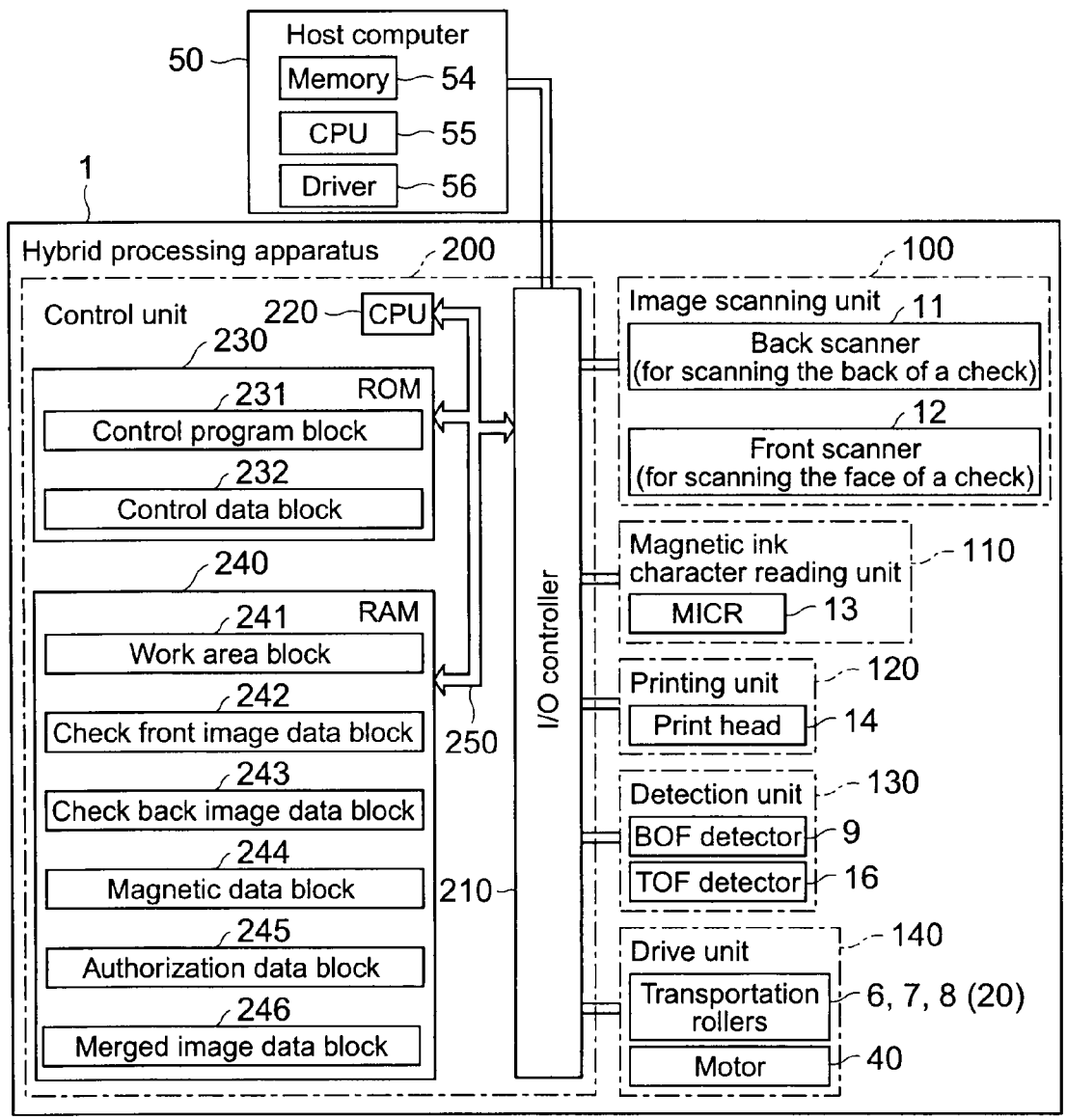
FIG. 4 is a control block diagram of a check processing apparatus according to the present invention.

The second transportation rollers 7 are located in a second corner part of the transportation path P. The discharge rollers 8 are positioned downstream from the second transportation rollers 7 near the check exit 4. A print head 14, comprising the printing unit 120 shown in FIG. 4, is positioned in the straight portion 35b between the second transportation rollers 7 and discharge rollers 8. The print head 14 is mounted on a carriage 15, which can move along a guide shaft 16a. The print head 14 can thus be moved by way of the carriage 15 to a retracted position 19 and to a printing area 18 for printing on checks C.

To print on a check C, the print head 14 is stopped at a specific position in the printing area 18 and is then driven synchronized to check C transportation to print on the check C. Though described in further detail below, if roll paper is transported through this straight portion 35b while a check C is not in the transportation path P, the roll paper can be printed by synchronizing roll paper transportation (sub-scanning) to print head 14 movement (main scanning).

The discharge rollers 8 and check exit 4 are positioned downstream from the print head 14. When printing is completed, the check C is thus discharged from the check exit 4 by the discharge rollers 8. A discharge detector (not shown in the figure) comprised of a reflecting or transmitting photodetector is also positioned near the discharge rollers 8 for detecting if the printed check C has been discharged. A stacker (not shown in the figure) for collecting the discharged checks C could also be positioned downstream from the check exit 4.

The height of the outside guide 2a and inside guide 2b is less than the height (short dimension) of the conveyed check C in areas outside the U-shaped portion 34 of the transportation path where the front and back scanners 11, 12 and the MICR 13 are positioned. The check can thus be easily removed from the transportation path if a paper jam, for example, occurs while a check is being conveyed through the transportation path.

Though not shown in the figures, a hybrid processing apparatus 1 according to this embodiment of the invention also has a roll paper transportation path overlapping part of the straight portion 35b of the transportation path P, in addition to the transportation path P for conveying checks C. This roll paper transportation path is substantially perpendicular to the check transportation path P (that is, arranged in the direction passing through the page on which FIG. 3 is printed). A roll paper compartment for storing roll paper is positioned in the space between the straight portions 35a and 35b of the transportation path P. One end of the roll paper is drawn from the roll paper compartment into the roll paper transportation path, and is transported along the roll paper transportation path. If a check C is not in the transportation path P, the print head 14 moves in a main scanning direction through the printing area 18 proximally opposite the print head 14 to print on the roll paper. A hybrid processing apparatus 1 according to this embodiment of the invention can thus both print on checks C and on roll paper.

The hybrid processing apparatus 1 in this embodiment of the invention also has a vertical transportation path for vertically conveying a check C inserted between the outside guide 2a and inside guide 2b from a top opening formed between the outside guide 2a and inside guide 2b near the printing area 18. This vertical transportation path is a paper transportation path for validation printing in which a check C dropped into the transportation path from above is printed by moving the print head 14 positioned in the printing area 18 in the main scanning direction. When validation printing is completed, the check C is then discharged up and out from the transportation path.

As noted above, the print head 14 in this embodiment of the invention is mounted on a carriage 15 and can thus move horizontally along the straight portion 35b of the transportation path P. There are thus two check C printing modes: a stationary print head mode in which the position of the print head 14 remains fixed while the check C is carried horizontally past the print head 14 for printing, and a stationary check mode in which the position of the check C remains stationary while the print head 14 is moved horizontally over the check surface for printing.

When printing on roll paper the print head 14 prints one line while being carried on the carriage 15 horizontally over the paper surface. To print multiple lines, the roll paper is advanced one line (in the sub-scanning direction) after printing one line ends, and the print head 14 is then driven horizontally again (in the main scanning direction) while printing the next line. This operation repeats for each subsequent line.

Scanning a check C, reading magnetic ink characters, and printing on a check C are described next. When a check C is inserted by the operator in the direction of arrow A from the check insertion opening 3, the check C is nipped by the rollers and conveyed at a constant speed through the transportation path P.

More specifically, when the check C reaches the BOF detector 9, the BOF detector 9 detects the leading edge of the check C and thus causes the drive roller 6a of the first transportation rollers 6 to start turning. The check C is thus nipped by the first transportation rollers 6, that is, is smoothly gripped between the drive roller 6a and pressure roller 6b. Rotation of the drive roller 6a thus conveys the check C without slipping through the transportation path P guided by the outside guide 2a of the U-shaped portion 34.

When the leading edge of the check C conveyed by the first transportation rollers 6 reaches the TOF detector 16, the TOF detector 16 detects the leading edge of the check C. This causes the scanners 11, 12 and MICR 13 downstream therefrom to turn on and enter a standby mode. A hybrid processing apparatus 1 according to this embodiment of the invention is thus arranged to prevent unnecessary power consumption by supplying power only when needed to the necessary parts, including the drive rollers.

When a check C travels through the transportation path P, the back scanner 11 positioned on the outside guide 2a side scans the back of the check C, and the front scanner 12 positioned on the inside guide 2b side scans the face of the check C. The MICR 13 positioned on the inside guide 2b side then reads the magnetic ink characters preprinted on the check C.

As described in further detail below, the front image data g1 and the back image data g2 captured from the check C are stored temporarily in the check front image data block 242 and check back image data block 243, respectively, in the hybrid processing apparatus 1 (see FIG. 4). The CPU 220 later retrieves the image data from memory to generate the merged image data g3 and other processes.

When the leading edge of the check C passes the TOF detector 16 and reaches the second transportation rollers 7, the check C is nipped between the drive roller 7a and pressure roller 7b and is thus conveyed by rotation of the drive roller 7a into the straight portion 35b.

When the check C passes through the printing area 18 opposite the print head 14, the print head 14 prints to the check C. The print head 14 is stopped at a predefined position in the printing area 18 at this time and is driven to print in synchronization with the movement of the check C (print medium) in the main scanning direction.

After the back of the check C is printed by the print head 14, the check C is discharged in the direction of arrow B by the discharge rollers 8. More specifically, the drive roller 8a turns with the check C held between the drive roller 8a and pressure roller 8b to deliver the check C to the outside of the hybrid processing apparatus 1, thus completing check processing.

The control arrangement of the hybrid processing apparatus 1 and host computer 50 constituting the check processing apparatus 10 of the present invention is described next referring next to FIG. 4.

The hybrid processing apparatus 1 has an image scanning unit (image scanning mechanism) 100 for scanning checks C, an MICR unit (magnetic ink character reading mechanism) 110 for reading magnetic ink characters printed on the checks C, a printing unit 120 (printing mechanism) for printing on the back of the checks C, a detection unit 130 for detecting the leading edge and trailing edge of the checks C, a drive unit 140 for driving the other parts, and a control unit 200 connected to these other parts for controlling overall operation of the hybrid processing apparatus 1.

The image scanning unit 100 includes the scanners 11, 12 for scanning the front and back of a check, and thus captures an image of the front and back of each check C. The magnetic ink character reading unit 110 includes the MICR 13 for reading the magnetic ink characters printed on each check C. The printing unit 120 includes the print head 14 for printing primarily the authorization data d received from the host computer 50 in the bank processing area C2 on the back of each check C.

The detection unit 130 includes the BOF detector 9 and TOF detector 16 for detecting the leading edge and trailing edge, respectively, of the check C.

The drive unit 140 includes the first transportation rollers 6, second transportation rollers 7, and discharge rollers 8 (transportation mechanism 20), and the motor 40 for rotationally driving the drive rollers 6a, 7a, 8a of the roller sets 6, 7, 8.

The control unit 200 includes the CPU 220, ROM 230, RAM 240, and input/output control apparatus 210 (referred to below as the I/O controller) connected to each other by an internal bus 250.

The ROM 230 has a control program block 231 and a control data block 232. The control program block 231 stores a program for controlling scanning, reading and printing on a check C, a program for generating the merged image data g3 by merging the back image data g2 captured from the check C with the authorization data d received from the host computer 50, and other programs run by the CPU 220. The control data block 232 stores control data for generating the merged image data g3 and other data tables.

RAM 240 is used as working memory for the control processes run by the CPU 220, and includes a work area block 241 for temporarily storing data and flags, a check front image data block 242 for temporarily storing front image data g1 captured from a check C, a check back image data block 243 for temporarily storing the back image data g2 captured from the check C, a magnetic data block 244 for temporarily storing the magnetic ink character data read from the check C, an authorization data block 245 for temporarily storing the authorization data d received from the host computer 50, and a merged image data block 246 for temporarily storing the merged image data g3 generated by merging the back image data g2 and the authorization data d.

The I/O controller 210 is an arrangement of gate arrays, custom IC chips, and other logic circuits for complementing the function of the CPU 220 and processing interface signals for communication with peripheral devices. The I/O controller 210 thus passes the image data captured by the scanners 11, 12 from the front and back sides of the check C, the magnetic data captured by the MICR 13, and the authorization data and control data received from the host computer 50 to the internal bus 250 either directly or after processing the data, and in conjunction with the CPU 220 outputs data and control signals output from the CPU 220 to the internal bus 250 to the printing unit 120 either directly or after processing the data.

Thus comprised, the CPU 220 controls the merged image data g3 generation process and printing on a check C by controlling signal and data processing in the hybrid processing apparatus 1 according to a control program read from ROM 230 through the I/O controller 210.

The host computer 50, which is connected to the hybrid processing apparatus 1 for use, has memory 54 such as ROM and RAM, a CPU 55 for controlling the other parts of the host computer 50, and a driver 56, which is a program for controlling the hybrid processing apparatus 1.

Memory 54 is used to store control data including data tables and control programs run by the CPU 55 in ROM, and as working memory for control processes and storing data temporarily in working memory and registers in RAM. This temporarily stored data includes information input by the operator (such as the bank name and number), the merged image data g3 received from the hybrid processing apparatus 1, and the front image data g1 from the check C.

When an authorization data request command requesting transmission of the authorization data is received from the hybrid processing apparatus 1, the host computer 50 generates the authorization data d by adding the processing date, processing number, and other information to information stored in RAM (the bank name and number), and sends the authorization data d to the hybrid processing apparatus 1.

Figure 5:
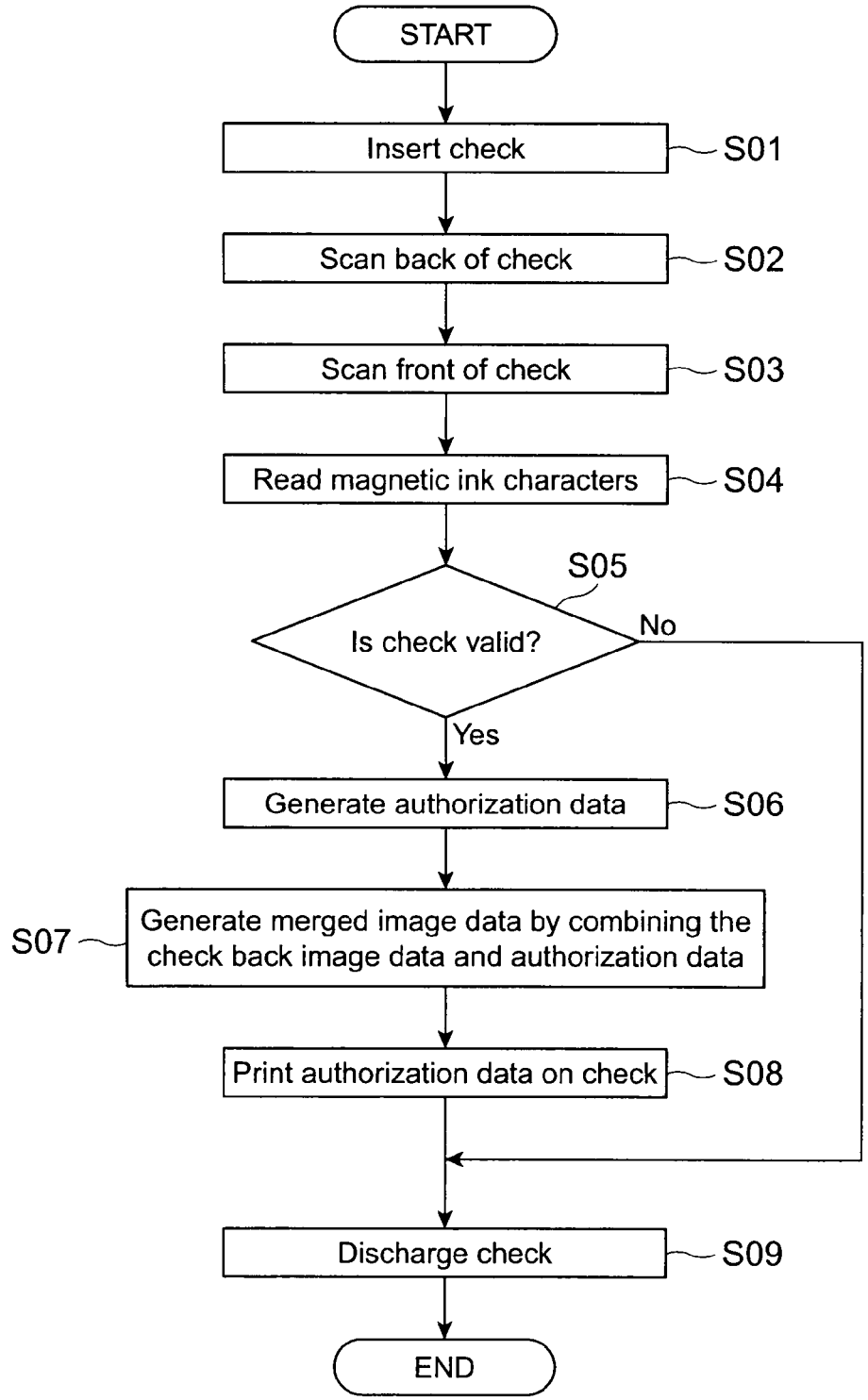
FIG. 5 is a flow chart showing an operation from check scanning to printing.

The check C scanning process, the magnetic ink character reading process, and check C printing process of the hybrid processing apparatus 1 are described next below with reference to the flow chart in FIG. 5.

When a check C is fed into the hybrid processing apparatus 1 from the check insertion opening 3 (S01), the check C is conveyed to a position opposite the back scanner 11 and the back scanner 11 then scans the back side of the check C(S02). The CPU 220 temporarily stores the back image data g2 captured from the check C through the I/O controller 210 to the check back image data block 243 in RAM 240.

After the back is scanned the check C is conveyed to a position opposite the front scanner 12 and the front scanner 12 thus scans the face of the check C(S03). The CPU 220 then also stores this front image data g1 from the check C through the I/O controller 210 to the check front image data block 242 in RAM 240.

After the front image data is captured the check C is conveyed to a position opposite the MICR 13 and the MICR 13 then reads the magnetic ink characters printed on the check C(S04). The magnetic data captured by the MICR 13 is sent through the host computer 50 to the transaction processing server, and the host computer 50 then determines if the check C is valid or invalid based on the response from the transaction processing server (S05). If the hybrid processing apparatus 1 receives a report from the host computer 50 indicating that the check C is valid (S05 returns yes), the hybrid processing apparatus 1 sends an authorization data request command to the host computer 50. The magnetic data from the check C is stored in the magnetic data block 244.

The host computer 50 generates and sends the authorization data d to the hybrid processing apparatus 1 (S06).

When the hybrid processing apparatus 1 receives the authorization data d, the hybrid processing apparatus 1 merges the back image data g2 of the check C stored in the check back image data block 243 with the received authorization data d, and thus generates the merged image data g3 (S07). This merged image data g3 is stored in the merged image data block 246.

The check C is then conveyed to a position opposite the print head 14, which is standing by in the printing area 18 (see FIG. 3), and the hybrid processing apparatus 1 thus prints the authorization data d on the back of the check C(S08). The check C is then discharged and processing ends (S09).

If the hybrid processing apparatus 1 receives a report from the host computer 50 indicating that the check C is invalid (S05 returns no), the hybrid processing apparatus 1 stops processing the check C and discharges the check without further processing (S09).

The merged image data g3 could alternatively be generated by the host computer 50 merging the authorization data d generated by the host computer 50 with the front image data g1 and back image data g2 received from the hybrid processing apparatus 1.

Furthermore, if the host computer 50 determines that the check is valid, the host computer 50 could immediately send the authorization data d to the hybrid processing apparatus 1. This eliminates the steps of sending, receiving, and processing the authorization data request command.

Producing the merged image data g3 is described next with reference to FIG. 6A and FIG. 6B.

Figure 6A:
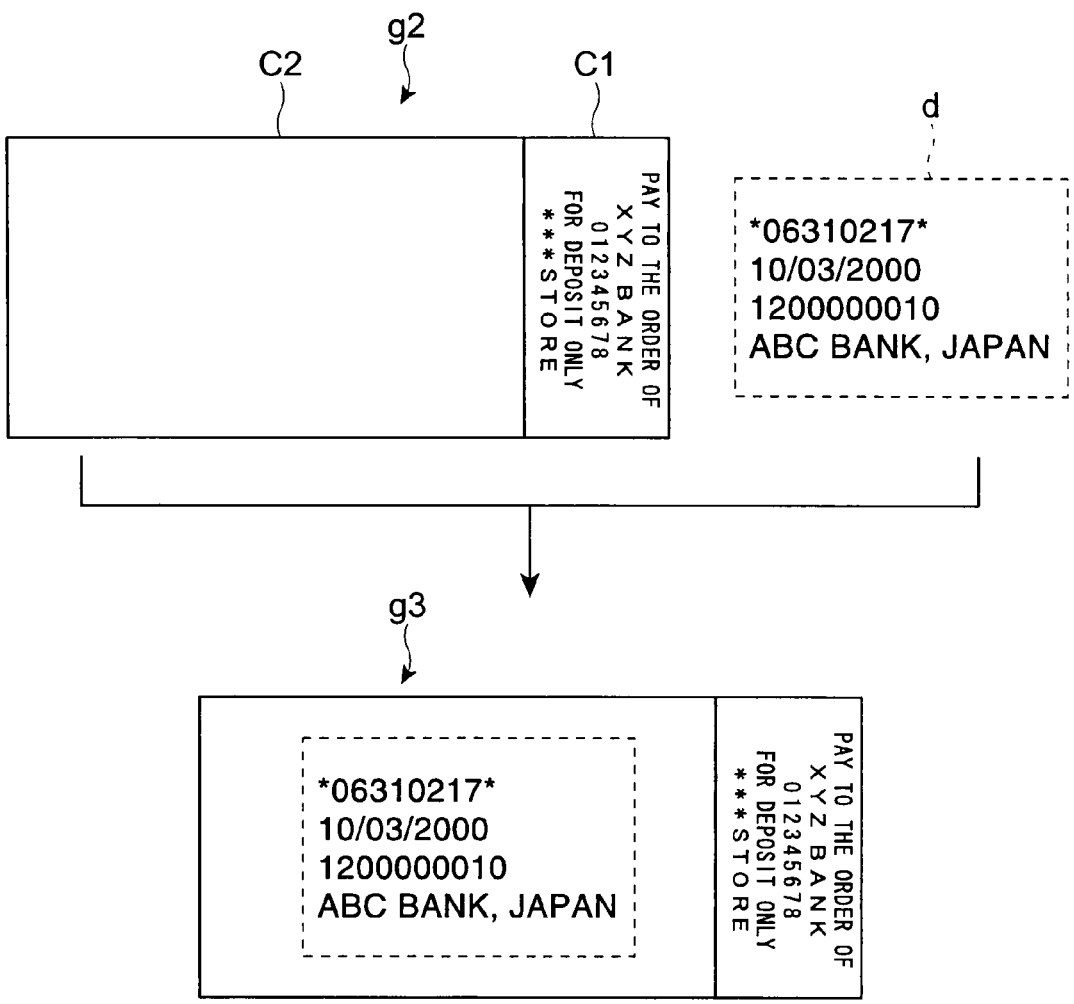
FIG. 6A illustrates generating the merged image data in a preferred embodiment of the present invention.
Figure 6B:
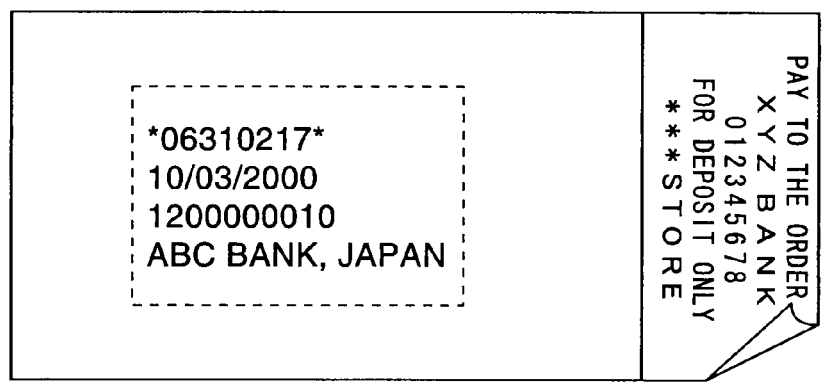
FIG. 6B shows the printed back of check.

The hybrid processing apparatus 1 generates the merged image data g3 as shown in FIG. 6A by pasting the authorization data d onto the bank processing area C2 in the back image data g2 of the check C stored in the check back image data block 243. The result is merged image data g3 functionally identical to an image of the back of the check C to which the authorization data d is actually printed as shown in FIG. 6B. The back image data g2 of the check C is stored with specific image coordinate data in the check back image data block 243, and the authorization data d is recorded with specific coordinate data in the authorization data block 245. The merged image data g3 is then produced by writing the image data and coordinate data from the check back image data block 243 and the image data and coordinate data from the authorization data block 245 to specific locations in the merged image data block 246. The coordinate data enable pasting the authorization data d in the back image data g2 while avoiding the endorsement area C1 used by the store to endorse the check. The coordinate data can be an address in RAM or other such data.

The merged image data g3 thus generated is stored temporarily in the merged image data block 246. When the merged image data g3 is then saved as a result of a user instruction, for example, the merged image data g3 is sent with the front image data g1 of the check C to the host computer 50 and is stored by the host computer 50.

Figure 7A:
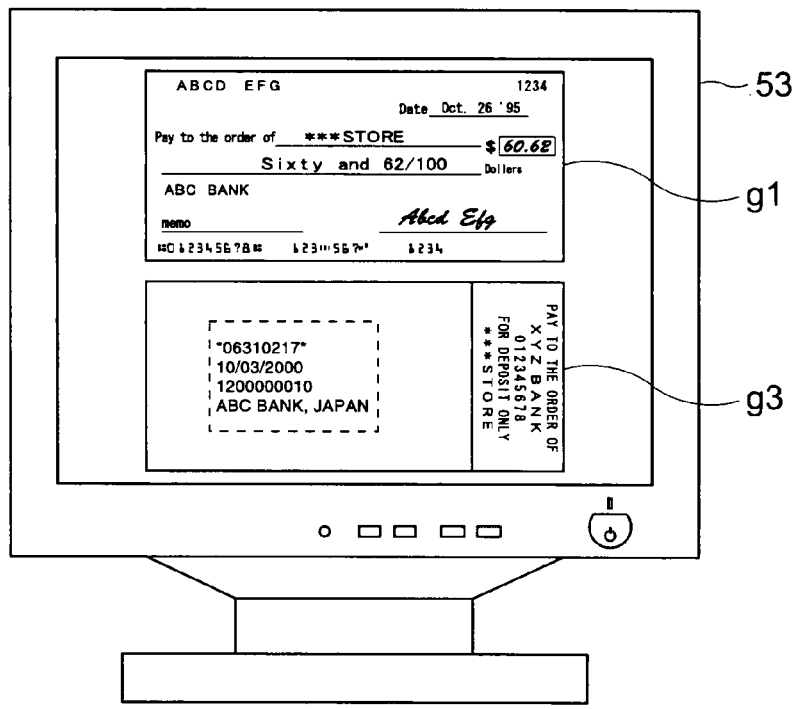
FIG. 7A illustrates a use of the merged image data produced in a preferred embodiment of the present invention.
Figure 7B:
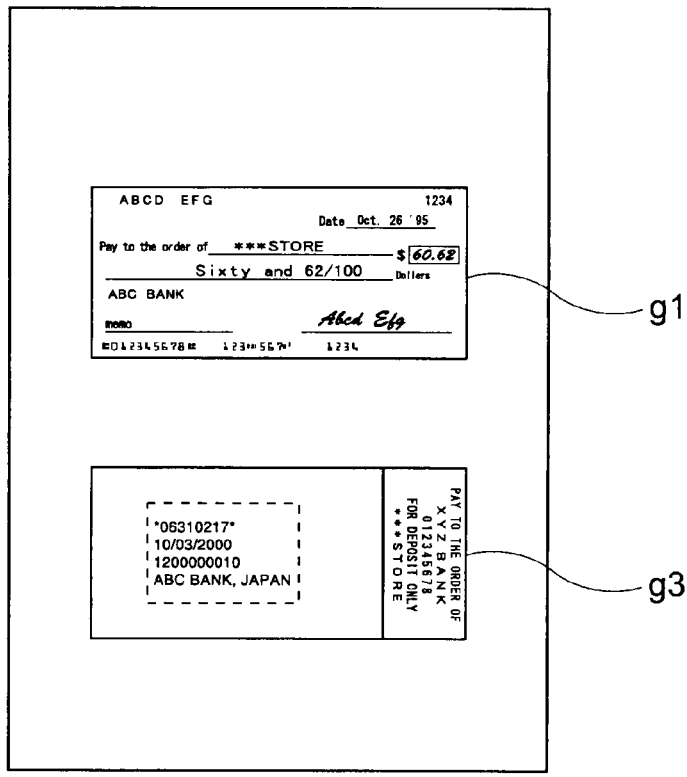
FIG. 7B shows the image data of both sides of check C printed on a single page.

The merged image data g3 can be used by displaying the merged image data g3 on the display 53 of the host computer 50 for confirmation by the operator (see FIG. 7A, for example), or the front image data g1 of the check C and the merged image data g3 representing the back of the check C after the check C is printed could be printed and output on a single page as shown in FIG. 7B. This is convenient for outputting and storing images of both sides of the check.

Furthermore, if a problem occurs the operator can enter the check serial number, account holder name, check date, or payee in the host computer 50 to search for and output the saved image data. The retrieved data can be output by displaying the data on the display 53 of the host computer 50 or using the hybrid processing apparatus 1 of the present embodiment, or by printing the data with a separate printer connected to the host computer 50.

Figure 8:
FIG. 8 illustrates another use of the merged image data produced in a preferred embodiment of the present invention.

A scanner for reading a driver license or cash or credit card, for example, could also be incorporated in this hybrid processing apparatus 1. This enables also capturing an image of the driver license or cash or credit card presented as personal identification when cashing or using a check C, and storing the identification image with the check C image data. Yet further, the front image data g1, merged image data g3, and the image data captured from the driver license or cash or credit card can be printed on a single page as described above or displayed on the display 53 (see FIG. 8). Illegal use of forged, stolen, or lost checks can thus also be prevented or reduced by also capturing an image of the user's identification.

While thus featuring a compact configuration having a scanner positioned on the upstream side of the print head, a hybrid processing apparatus 1 according to this embodiment of the present invention can acquire an image that is functionally identical to an image of the back of a check C after authorization data d is printed thereto, and can acquire this image using a simple control and a single check insertion operation.

Furthermore, image data that is functionally identical to an image of the back of a check C after authorization data d is printed thereto can even be acquired using a hybrid processing apparatus that does not have a printing function.

While electronic payment systems enabling data read from a check to be communicated over a network for transaction processing are available, not all banks have introduced such electronic payment systems. As a result, some banks can and some banks cannot process such check data as the check amount and check number read from individual checks.

Another method of processing check payments in this case is by sending a substitute check instead of the check data to banks that have not yet introduced the foregoing electronic payment system. These substitute checks have the check front image data, bank authorization data, magnetic ink character data, and check back image data printed out on a single sheet.

Figure 9A:
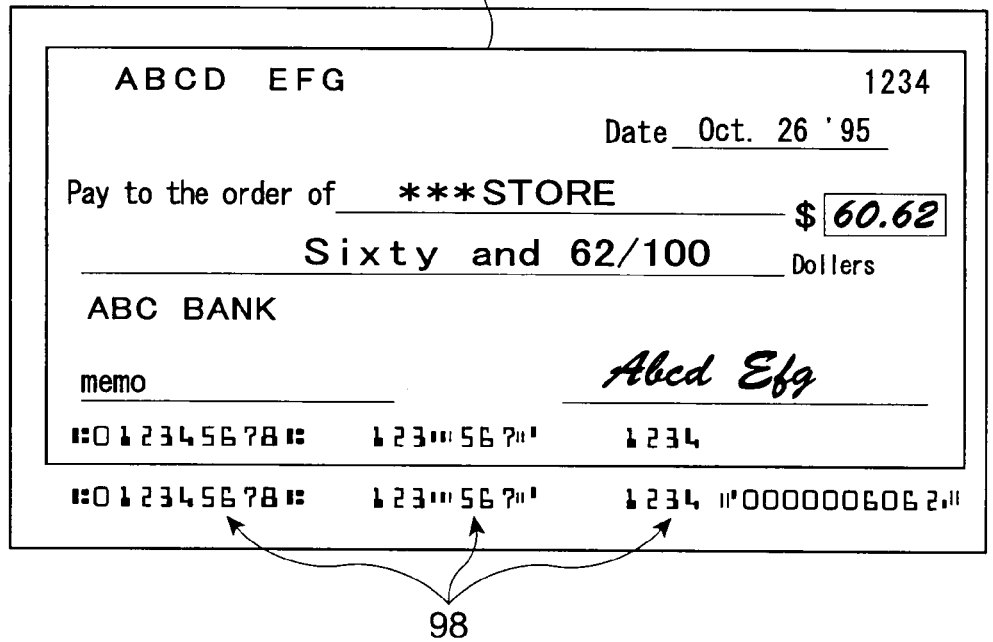
FIG. 9A is a plan view showing a face of substitute check generated using a check processing apparatus according to the present invention.
Figure 9B:
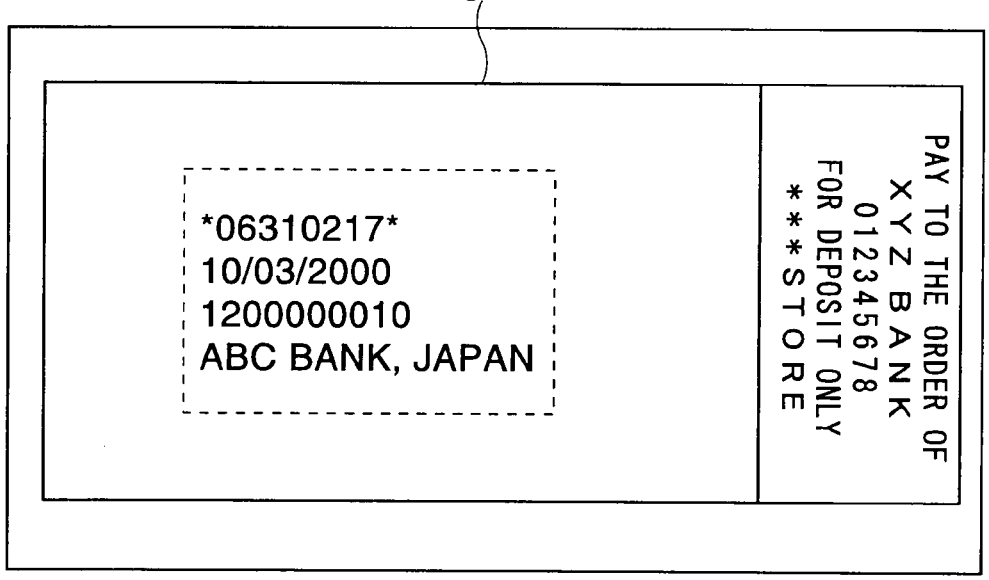
FIG. 9B is a plan view showing a back of substitute check generated using a check processing apparatus according to the present invention.

As described above, a check processing apparatus 10 according to the present invention can generate image data that is functionally identical to an image of the back of a check after the authorization data d has been printed. The image data acquired as described above can thus be used to output a substitute check as described above. See, for example, FIG. 9A and FIG. 9B.

The present invention has been described using a check by way of example as the imaging medium and print medium, but the invention shall not be limited to using a check as the imaging medium or print medium. A cashier's check, promissory note, or other instrument could alternatively be used as the imaging medium or print medium.

A function for selecting whether to generate the merged image data g3 can also be rendered in the driver 56 stored on the host computer 50. This enables even more efficient operation because the merged image data g3 is generated only when needed. If generating the merged image data g3 is not selected, or if the back image data is acquired after the authorization data d has been printed, the check C can be reinserted for scanning the back of the check after the authorization data d is printed and the check C is discharged.

The method of operation of the check processing apparatus 10 or check processing method of the present invention as described above can also be embodied as a program on a machine-readable or computer-readable medium.

Examples of such data recording media include and are not limited to CD-ROM, flash ROM, memory cards (such as Compact Flash (R), Smart media, and memory sticks), Compact Disc (R), magneto-optical disc, DVD media, and floppy disks.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A check processing method comprising:
scanning a back of a check having no authorization data printed thereon;
generating authorization data indicating that processing a check payment has been completed and that the check is valid based on a reading of magnetic ink characters preprinted on the check and a response from an external analysis source, the authorization data being generated electronically and not being printed on the check; and
generating an electronic merged image by electronically combining back image data captured during the scanning of the back of the check with generated authorization data, such that, in the electronic merged image, the authorization data appears outside of an endorsement area, the electronic merged image being generated without printing any data;
wherein the steps of scanning the back of the check, generating authorization data, and generating the electronic merged image are performed in a single pass of the check in one direction through a transportation path of a check processing apparatus.

2. A medium readable by a machine embodying a program of instructions executable by the machine to perform a check processing method, the program of instructions comprising:

instructions for scanning a back of a check having no authorization data printed thereon;

instructions for generating authorization data indicating that processing a check payment has been completed and that the check is valid based on a reading of magnetic ink characters preprinted on the check and a response from an external analysis source, the authorization data being generated electronically and not being printed on the check;

instructions for generating an electronic merged image by electronically combining back image data captured during the scanning of the back of the check with generated authorization data, such that, in the electronic merged image, the authorization data appears outside of an endorsement area, the electronic merged image being generated without printing any data; and instructions for performing the operations of scanning the back of the check, generating authorization data, and generating the electronic merged image in a single pass of the check in one direction through a transportation path of a check processing apparatus.

3. A check processing apparatus configured to communicate with a host device, the check processing apparatus comprising:

a transportation path for conveying a check from a check insertion opening to an exit opening;

a transportation mechanism that conveys the check through the transportation path;

a back image scanning component that captures a back image of the check conveyed through the transportation path;

an authorization data component that sends a request to the host device for electronic authorization data indicating that processing a check payment has been completed and that the check is valid based on a reading of magnetic ink characters preprinted on the check and a response from an external analysis source, wherein the authorization data component receives the requested electronic authorization data from the host device if the check is determined to be valid; and a merged image generating component that generates an electronic merged image by combining the back image data captured by the back image scanning component with the received electronic authorization data, such that, in the electronic merged image, the electronic authorization data appears outside of an endorsement area;

wherein the back image is captured, the authorization data is requested, and the electronic merged image is generated in a single pass of the check in one direction through the transportation path.

* * * * *